United States Patent [19]

Hickman

[11] 4,269,241

[45] May 26, 1981

[54] PROCESS AND APPARATUS FOR SEVERING LIMBS

[75] Inventor: Lewis Hickman, Montgomery, Ala.

[73] Assignee: Products for Energy, Inc., Montgomery, Ala.

[21] Appl. No.: 3,229

[22] Filed: Jan. 15, 1979

[51] Int. Cl.³ .................. F16M 11/04; B27L 1/00
[52] U.S. Cl. .................................. 144/2 Z; 30/122; 30/379.5; 144/34 R
[58] Field of Search ............... 144/2 Z, 3 D, 34 R, 144/309 AC; 30/379.5, 122, 166 A; 83/928

[56] References Cited

U.S. PATENT DOCUMENTS

| | | | |
|---|---|---|---|
| 776,743 | 12/1904 | Holdt | 144/34 R |
| 1,364,432 | 1/1921 | Georgelis | 30/379.5 |
| 2,538,371 | 1/1951 | Le Tourneau | 144/34 R |
| 3,234,976 | 2/1966 | Grant | 144/2 Z |
| 3,343,575 | 9/1967 | Trout | 144/2 Z |
| 3,565,372 | 2/1971 | Jones et al. | 144/34 R X |
| 3,664,391 | 5/1972 | Coffey | 144/3 D |
| 3,688,816 | 9/1972 | Runeson | 144/3 D |
| 3,720,246 | 3/1973 | David | 144/2 Z |
| 4,063,359 | 12/1977 | Luscombe | 30/379.5 |

Primary Examiner—W. D. Bray
Attorney, Agent, or Firm—Newton, Hopkins & Ormsby

[57] ABSTRACT

A motorized vehicle carries a telescoping boom, pivotally mounted thereon by its proximal end portion for rotation about a vertical axis and for pivoting about a horizontal axis from a horizontal position to a vertical position. The distal end portion carries a limb engaging and cutting assembly having opposed outwardly diverging guide bars which converge toward a hydraulically driven rotary saw which is movable, along the longitudinal axis of the boom, outwardly to cut the limb as it is held in the throat between the guide bars. A pair of hydraulically operated pivoted grappling hooks confine a limb in the throat for severing action by the saw. The assembly is rotatable about the longitudinal axis by a hydraulic motor. Remote controls in the cab of the vehicle permit selective actuation of the components.

28 Claims, 6 Drawing Figures

PROCESS AND APPARATUS FOR SEVERING LIMBS

BACKGROUND OF THE INVENTION

1. Field of the Invention:

This invention relates to limb severing apparatus and is more particularly concerned with an apparatus and method of severing limbs from standing trees, primarily for clearing the right-of-way for electrical and telephone overhead wires.

2. Description of the Prior Art

In the past, the cleaning of limbs from standing trees has routinely been accomplished by power companies through the utilization of a vehicle having a boom which carries at its end a gondola. The gondola is positioned adjacent to the limb and a man in the gondola utilizes a chain saw in order to sever the limb. Of course, this procedure is expensive, time consuming and has the danger of dropping the limb onto cables which are strung therebeneath. In some instances, the limbs may be wet and touch wires which carry high voltage. Therefore, there is a danger of electrical shock involved in this procedure.

In the prior art are innumerable devices which, through various means, sever parts of a tree; however, most of these devices are employed to sever the trunk of a tree when the tree is harvested. Attempts have been made to provide the mechanism for severing the limbs of a standing tree. Such mechanisms are, however, quite complicated. The following United States patents disclose the state-of-the-art as known to the inventor:

U.S. Pat. No. 2,663,952 discloses a telescoping boom with a mechanism for clamping a tree. U.S. Pat. No. 3,252,487 discloses a device for delimbing a tree. U.S. Pat. No. 3,443,611 discloses another tree trimming device on an extendible boom. U.S. Pat. No. 3,461,928 discloses a boom mounted saw which cooperates with a clamp mechanism. Still another tree shear is shown in U.S. Pat. No. 3,468,352.

The applicant is also aware of the following additional prior art patents relating to devices for severing trees:

| | |
|---|---|
| 3,183,949 | 3,720,246 |
| 3,389,728 | 3,763,905 |
| 3,529,642 | 3,974,866 |
| 3,675,691 | 3,991,799 |
| | 4,050,488 |

SUMMARY OF THE INVENTION

Briefly described, the present invention includes a motorized vehicle which has a cab for the operator. The rear portion of the motorized vehicle is relatively flat and contains an upright stanchion on which the proximal end portion of the telescoping boom is carried. The boom is rotatable about an upright or verticle axis through 360° and is pivotal about a horizontal axis from a horizontal position to essentially a vertical position. The proximal end portion of the boom carries a plurality of reels for hydraulic lines which lead forwardly to the distal end of the boom. The boom is hydraulically telescoped outwardly and inwardly, as desired.

The distal end of the boom is provided with a limb engaging and cutting assembly having opposed outwardly diverging guide bars carried by their inner ends, the guide bars converging toward a throat adjacent to which is a hydraulically driven rotary saw which is movable axially of the boom outwardly and inwardly to sever the limb in the throat. A pair of hydraulically operated grapple arms are movable from a position adjacent the inner edge of one of the guide bars to a position engaging the outer periphery of the limb so as to confine the limb quite firmly within the throat defined by the junction of the two guide bars. Thus, the limb is quite firmly held in place as the rotary saw severs the limb. Furthermore, the arrangement is such that the grapple arms continue to retain the limbs so that it does not fall but, rather, can be manipulated by the assembly, as desired, so as to assure that the limb does not strike the cables.

Accordingly, it is an object of the present invention to provide a limb severing apparatus which may be operated from a remote position by the operator to sever a limb in a tree.

Another object of the present invention is to provide a limb severing apparatus which is relatively inexpensive to manufacture, durable in structure and efficient in operation.

Another object of the present invention is to provide a limb severing device which is particularly suited to clear the right-of-way for power lines and to maintain the right-of-way in a cleared condition.

Another object of the present invention is to provide a limb severing device which requires no great skill to operate and which will eliminate the need for elevating a person into the vicinity of the limb to be severed.

Another object of the present invention is to provide a limb severing apparatus which will effectively grasp the limb, push the limb away from any power lines which may be in the immediate vicinity and then sever the limb, holding the limb away from the power lines and thereafter manipulating the limb so as to clear the power lines.

Another object of the present invention is to provide a limb severing apparatus which, once the limb has been grasp, will sever the limb quite quickly and efficiently and will retain the limb in its prescribed position, after such severance and then will move the limb in a prescribed path so that the limb will clear obstacles.

Other objects, features and advantages of the present invention will become apparent from the following description when taken in conjunction with the accompanying drawings wherein like characters of reference designate corresponding parts throughout the several views.

DESCRIPTION OF THE PREFERRED EMBODIMENT

Figure 1:
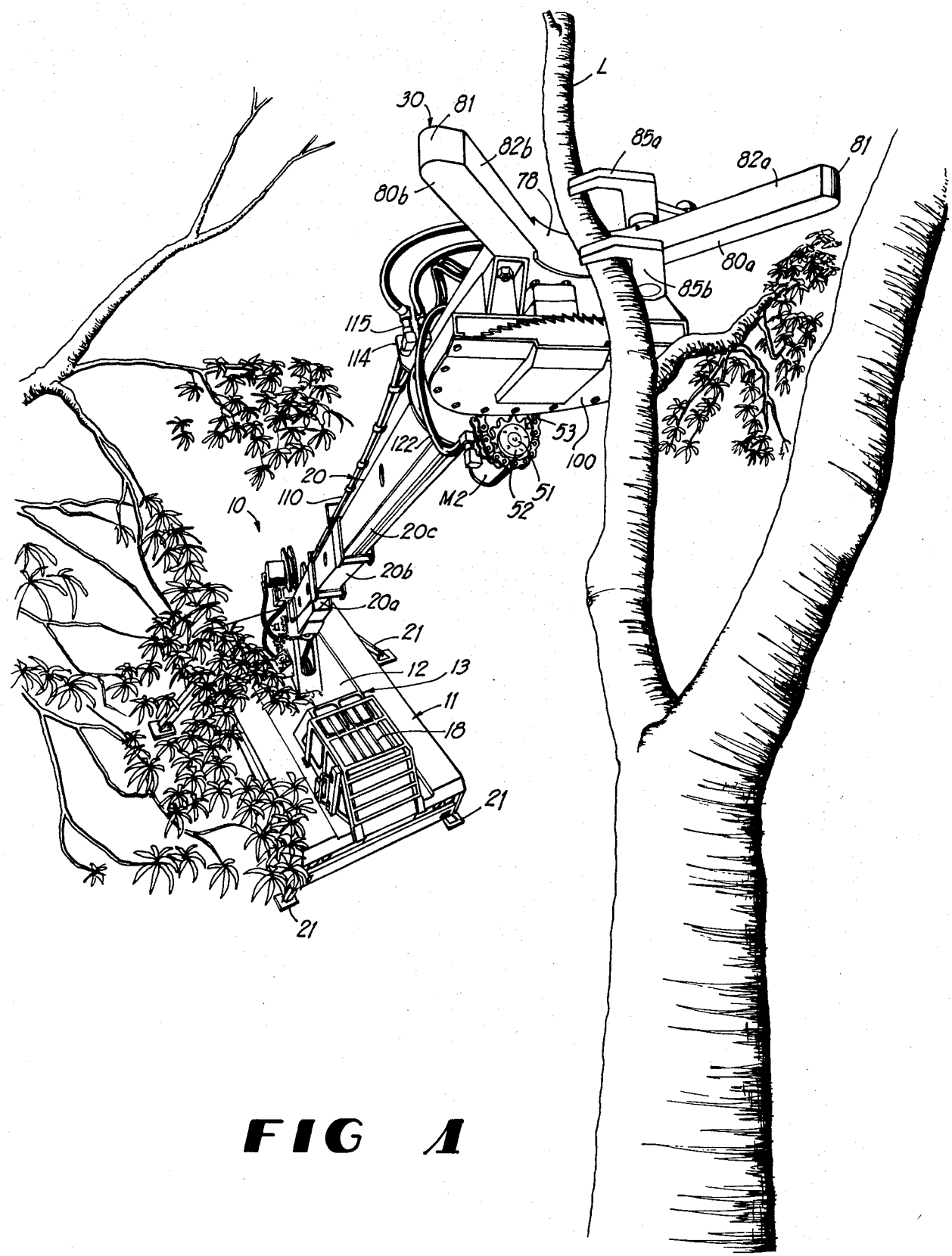
FIG. 1 is a perspective view of a limb severing apparatus constructed in accordance with the present invention, the limb severing apparatus being illustrated with its boom in an extended position and its limb engaging and severing head in the process of severing a limb from a standing tree.

Referring now in detail to the embodiment chosen for the purpose of illustrating the present invention, numeral 10 denotes generally a self propelled vehicle which, in the present embodiment includes a truck or tractor 11 provided with a flat horizontal bed or deck 12 and a cab 13, the cab 13 being disposed in the forward portion of the platform 12. The vehicle 10 is also provided with front steerable wheels 14 and rear drive wheels 15. The cab 13 is enclosed by a boom supporting frame 16. The boom supporting frame 16 includes a plurality of upstanding stanchions 17 mounted on the deck 12 and supporting an upper horizontal frame which forms a cradle 18 for the central portion of shank 20a of boom 20. The vehicle 10 also includes four retractable legs 21 which can be positioned on the ground in order to provide additional ground contact and support for the truck 11.

In the central portion along the longitudinal axis of the bed 12, rearwardly of the cradle 18 is an upright fixed stanchion 22 on which is pivotally mounted a carrage 23. The carriage 23 is povital about a vertical axis α and tapers upwardly (as shown in broken lines) to provide a transverse bearing for a trunnion shaft 24 carrying the proximal end portion of the boom shank 20a. Thus, the boom 20 is rotatable by its proximal end portion about the vertical axis α and is pivotal from essentially a horizontal position as shown in full lines in FIG. 2 to an inclined position (as shown by broken lines) and upwardly to substantially a vertical position, pivoting about the horizontal axis β of trunnion shaft 24.

The boom 20 is a telescoping boom which includes the tubular boom body or shank 20a, the distal end of which slideably receives an intermediate tubular boom extension member 20b which, in turn, carries an outer tubular boom extension member 20c. Through manipulation of hydrualic controls (not shown) the boom 20 is selectively pivoted about the vertical axis α, selectively pivoted about the horizontal axis β and extended and retracted, as desired.

The structure thus far described is conventional and is usually employed to carry, at the outer end of the boom extension 20c, a gondola (not shown) within which a man rides, carrying a chain saw for manually severing the limbs, when the boom 20 positions the man adjacent the limb.

According to the present invention, the gondola (not shown) is removed and, in its place, is positioned the limb engaging and cutting assembly, denoted generally by numeral 30. In more detail, the distal or outer end of the boom 20, i.e., the outer boom extension 20c, receives therein a tubular support member 26 which is provided, at its outer end portion with a radially extending annular butt flange 31 against which is mounted an annular flange 32 of a cylindrical bearing housing 33. Radially extending reinforcing plates 29 reinforce support member 26. Bolts 34 join the annular flanges 31 and 32 together. The cylindrical housing 33 is concentrically mounted with respect to the boom extension 20c and the support member 26 and extends forwardly, therefrom.

The outer or distal end of the housing 33 is provided with an annular butt flange 35 which receives a bearing retaining collar 36, the collar 36 being bolted thereto by bolts 37.

Figure 3:
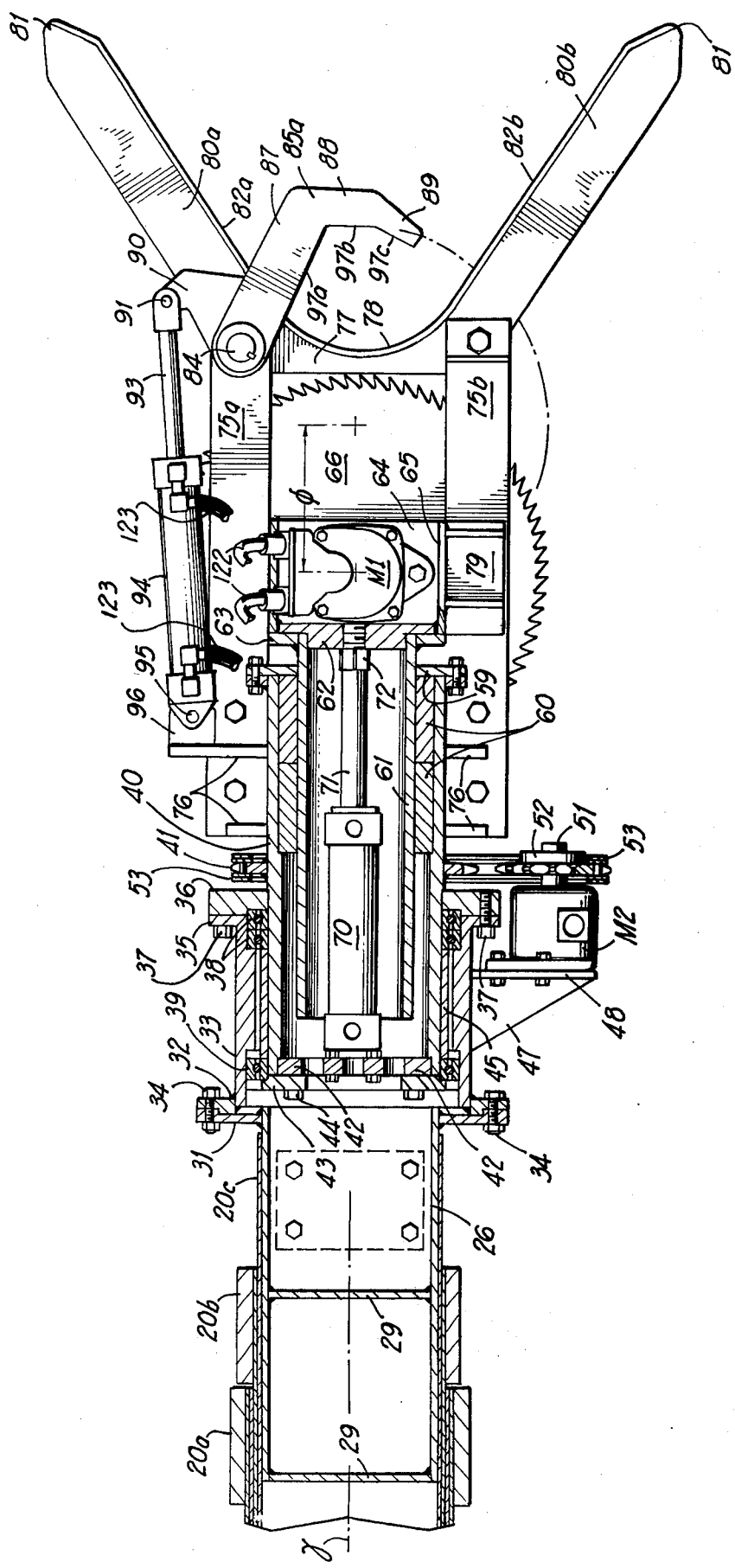
FIG. 3 is an enlarged side elevational view partially in cross section of the limb engaging and severing assembly of the apparatus illustrated in FIGS. 1 and 2.

As seen in FIG. 3, the housing 33 is counterbored from both ends to receive the outer races of outer bearings 38 in the distal end, and the outer race of the inner bearing 39 at its inner end portion. The inner races of bearings 38 and 39 are received on the outer periphery of an outer cylindrical sleeve or shaft 40 which protrudes forwardly beyond the extremety of the housing 33 and is provided, outwardly of the collar 36, with a sprocket 41. The sprocket 41 is carried in the central portion of the sleeve 40 but is spaced forwardly of the collar 36. At the inner or proximal end of the shaft 40 is fixed an end plate 42 which extends radially across the end portion thereof. An annular bearing retaining plate 43 is bolted by bolts 44 to plate 42, the plate 43 extending outwardly over the surface of the inner bearing 39 so as to arrest outward movement of the shaft 40.

A spacer ring 45 extends around the periphery of the shaft 40, between the bearing 38 and 39. The purpose of the spacer ring 45 is to space the bearings 38 and 39 apart by an appropriate distance.

The inner periphery of the flange 32 is of smaller diameter than the inner periphery of the housing 33 and, therefore, the flange 32 arrests inward movement of the plate 43, thereby arresting appreciable inward movement of the shaft 40. Extending radially outwardly from the outer periphery of the housing 33 is a mounting bracket 47, the forward radially extending edge portion which is provided with a motor mounting plate 48. A reversible hydraulic motor M2, is mounted on the motor mounting plate 48 and extends forwardly therefrom, in an axial direction. The shaft 51 of the motor M2 extends in a longitudinal or axial direction and is provided with a drive sprocket 52 which is disposed in a common plane with the sprocket 41. A chain 53 extends around the two sprockets 41 and 52 so that the motor M2 may rotate, through sprocket 52, chain 53 and sprocket 41, the shaft 40 about the longitudinal axis γ.

Received within the distal end portion of outer shaft 40 are a plurality of cylindrical bushings 60 which, in turn, journal for both rotation and slideable action, a hollow cylindrical inner shaft 61, the outer end portion of which is closed via a cap 62. Bushings 60 are retained by retainer ring 59 on the end of shaft 40. This outer end portion also carries a motor mounting plate 63, the plate having a circular, central opening through which the shaft 61 protrudes and having a peripheral portion which abutts the protruding flange portion of cap 62. Protruding forwardly from one edge of the rectangular plate 63 is a motor mounting platform 64, seen in FIG. 4, which is disposed perpendicularly to the plate 63 and parallel to axis γ. A reinforcing gusset 65 extends between plate 63 and platform 64.

Carried by the platform 64 is a hydraulic saw motor M1, the shaft 67 of which protrudes through the platform and is provided with circular saw blade 66 parallel to platform 64. The central portion of blade 66 is sandwiched between two flat opposed circular discs 68a and 68b which, in turn, are urged together by the annular peripheral flanges 69a and 69b of a pair of opposed keepers 69c and 69d. Keeper 69d has a flat disc shaped body which carries the annular flange 69b and a central annular hub 69e which protrudes through the center of disc 68a, saw 66, disc 68b and the body of keeper 69c to protrude outwardly thereof. A nut 56, locked in place by a spanner 57, is threadedly received on the end of hub 69e and clamps the two keepers together. A bolt 58 passes through the hub 69e and is threadedly received in the end of the shaft 66. The head of bolt 58 is recessed in hub 69e. The bolt 58, hub 69e, flanges 69a, 69b, discs 68a, 68b and the saw 66 are concentric along the axis of shaft 66.

Platform 64 is movable in the longitudinal direction for cutting action of the blade 66, when the shaft 61 is extended and contracted.

Figure 6:
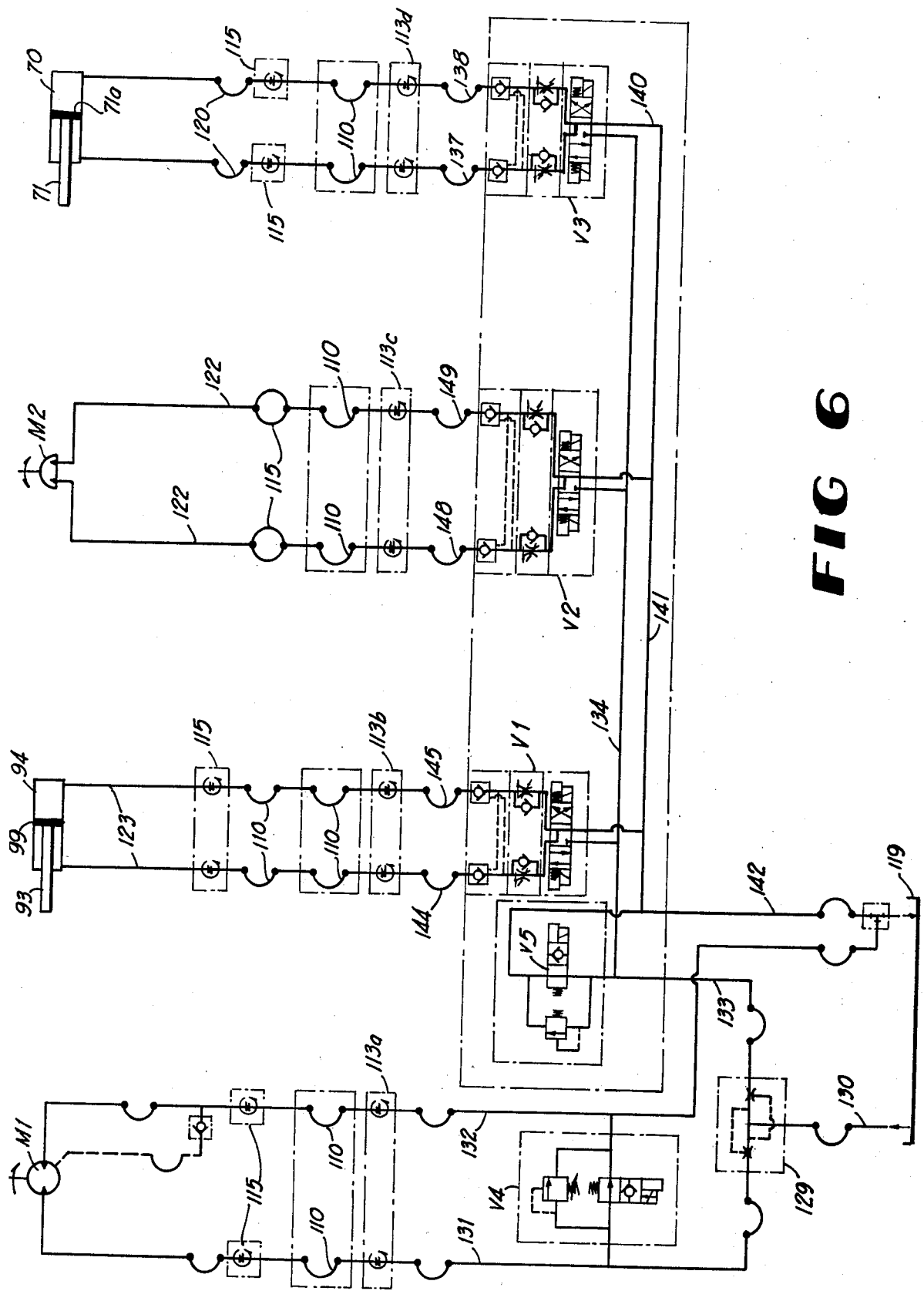
FIG. 6 is a diagram of a portion of the hydraulic system of the present invention.

The arrow in FIG. 3 indicates the distance $\phi$ of travel in a longitudinal direction of the shaft 67 in extending the blade 66 for cutting action. For extending and contracting the motor M2, a double acting hydraulic cylinder 70 is disposed along the axis $\gamma$, the base of the cylinder 70 being mounted to the butt plate 42 and the piston rod 71 thereof being threadedly received in a central hole in the cap 62. A retainer nut 72 locks the end portion of piston rod 71 in the cap 62. The inner end of the piston rod 71 is provided with an appropriate piston 71a (FIG. 6) within the cylinder 70 so that the piston rod 71 may be extended or contracted, as desired, by the appropriate action of the hydraulic fluid to the cylinder 70.

Disposed outwardly of the gussets 65, and outwardly of the shaft 40 are a pair of parallel forwardly extending reinforced tubular guide bars supporting members 75a and 75b which are secured by their inner end portion to the diametrically opposed surfaces of shaft 40, forwardly of the sprocket 41. Gussets 76, on opposite sides of the tubular members 75a and 75b reinforce this mounting on them. The tubular members 75a and 75b extend longitudinally forward well beyond the outer end of the shaft 40 and their end portions are joined by a crossbar 77 which has a concaved outer surface 78 forming a central throat for the assembly 30.

Slide plates, such as plate 79, extending outwardly from gusset 65, straddles support member 75a for guiding the travel of the platform 64 in its longitudinal movement.

Diverging from the ends of the tubular members 75a, 75b respectively, are a pair of forwardly diverging limb guide bars 80a, 80b, the outer ends of which are tapered forwardly to rounded tips 81. The ends of concave surface 78 of the crossbar 77 merge with the ends of inner camming surfaces 82a, 82b of the guide bars 80a, 80b.

At the junction of guide bars 80a and its support bar 75a is a fixed bushing 83 which protrudes above and below the surfaces of the guide bar 80a and support bar 75a. A pivot pin 84 is rotatably received within the bushing 83 and its end portions are provided with radially extending opposed parallel L-shaped grapple arms or limb clamps, denoted generally by the numerals 85a and 85b. The limb clamps 85a and 85b are generally identical in shape and are disposed parallel to each other, fixed at opposite ends of the pivot pin 84. Thus, each limb clamp 85a or 85b includes a shank 87 connected by its inner end to pin 84, an intermediate arm 88 connected to the outer end of the shank 87 and extending angularly therefrom, and a tip portion 89 which extends angularly from the intermediate portion 88 generally perpendicular to its shank 87.

The difference between the limb clamp 85a and the limb clamp 85b is that the limb clamp 85a is provided with an actuator arm 90 which is intergrally joined to its shank 87 at its inner end portion and extends angularly therefrom. The free end of the actuator arm 90 is provided with a pivot pin 91 which, in turn, is connected to a link 92 on the end of a piston rod 93. The piston rod 93, in turn, is secured to a piston 99 within a hydraulic double acting cylinder 94. The inner end of cylinder 94, in turn, is pivotally connected by a pivot pin 95 to a mounting bracket 96 which protrudes radially outwardly from the base portion of the supporting bar 75a. When the piston rod 93 is retracted into cylinder 94, the limb clamps 85a and 85b are withdrawn to the position shown in FIG. 2 so that their shanks 87, as well as their intermediate arms 88 and their tip portions 89 are disposed generally in alignment with its associated guide bar 80a, the extremity of the tip portions 89 being rearwardly of the outer camming surface 82a of the associated guide bar 80a. Thus, in the retracted position, the limb clamps do not interfere with the camming operations of the surfaces 82a, 82b of the guide bars 80a, 80b as the assembly or head 30 is extended forwardly so as to guide the limb L into the throat formed by the inner portions of surfaces 82a, 82b and the concaved surface 78 of the crossbar 77.

When the piston rod 93 is extended, both limb clamps 85a, 85b are simultaneously pivoted inwardly so that the hook formed by the intermediate arms 88 and the tip portions 89 swing over the outer peripheral portion of a limb L to confine the limb L in the throat between the concave surface 78 and the inner surfaces 97a, 97b and 97c of the limb clamps.

Figure 4:
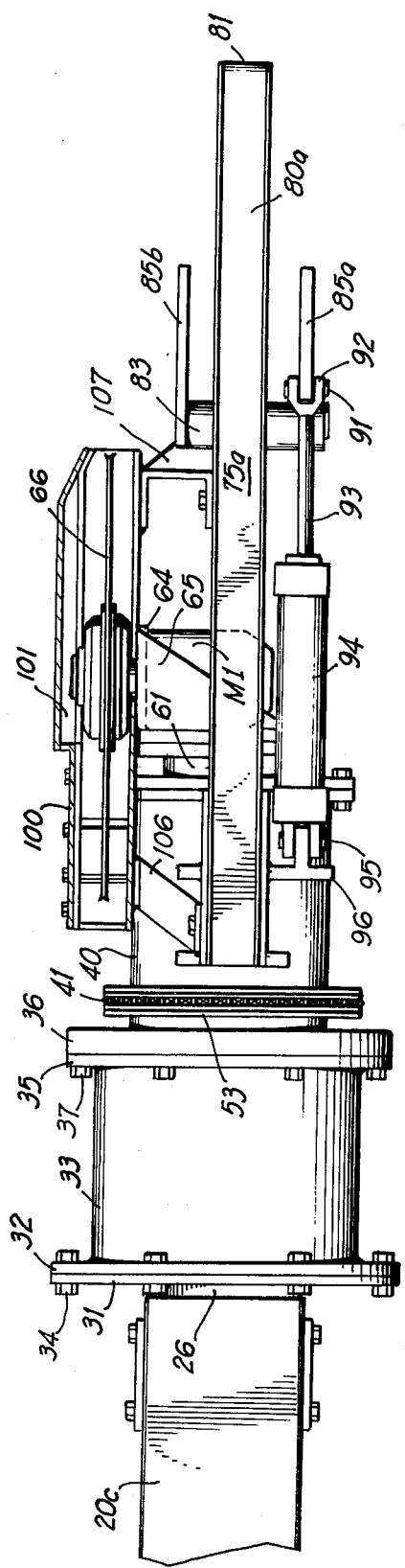
FIG. 4 is a top plan view of the structure depicted in FIG. 3.
Figure 5:
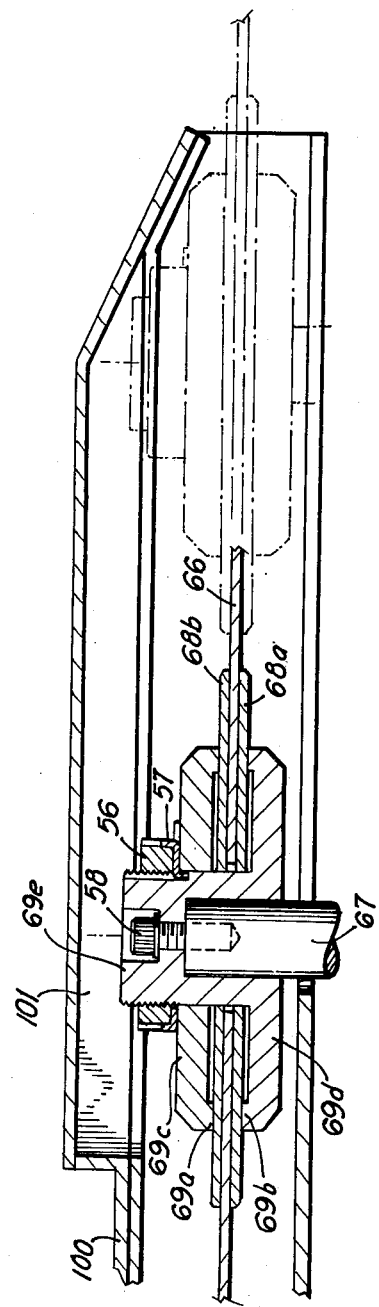
FIG. 5 is an enlarged vertical sectional view of a detail showing the saw of the apparatus in its retracted position.

It will be observed in FIG. 4 that the circular blade 66 is disposed in a plane outwardly of the plane of the limb clamp 85b and, therefore, is free to pass forwardly beyond the inner surfaces 97a, 97b and 97c when the motor M1 is moved outwardly through distance $\phi$. When, however, the motor M1 is in its retracted position, as depicted in full lines in FIG. 3, the periphery of blade 66 is inwardly of the concaved surface 78 and, hence, is normally free of any limb which is engaged by the assembly 30.

A cover housing or shield 100 shown in FIGS. 1, 2, 4 and 5, which has an axially or longitudinally extending nut confining trough 101 therein, extends around the inner portion of the blade 55 so that the lock nut assembly, i.e., nut 56, bolt 58 and hub 69e, of the blade rides in the trough 101 throughout the extent of travel of the motor M1, as the blade 66 is extended from its full line position in FIG. 4 to its broken line position therein. Preferably, the housing or shield 100 forms a closure which is concave along its inner edge portion so as to conform to the curvature of blade 66 when the motor M1 is in its retracted position. The housing 11, has a straight transverse forward edge portion defining a blade opening 102 through which the blade 66 protrudes when the motor M1 is in its extended position. The opening 102, however, is slightly rearwardly of the concaved surface 78.

Figure 2:
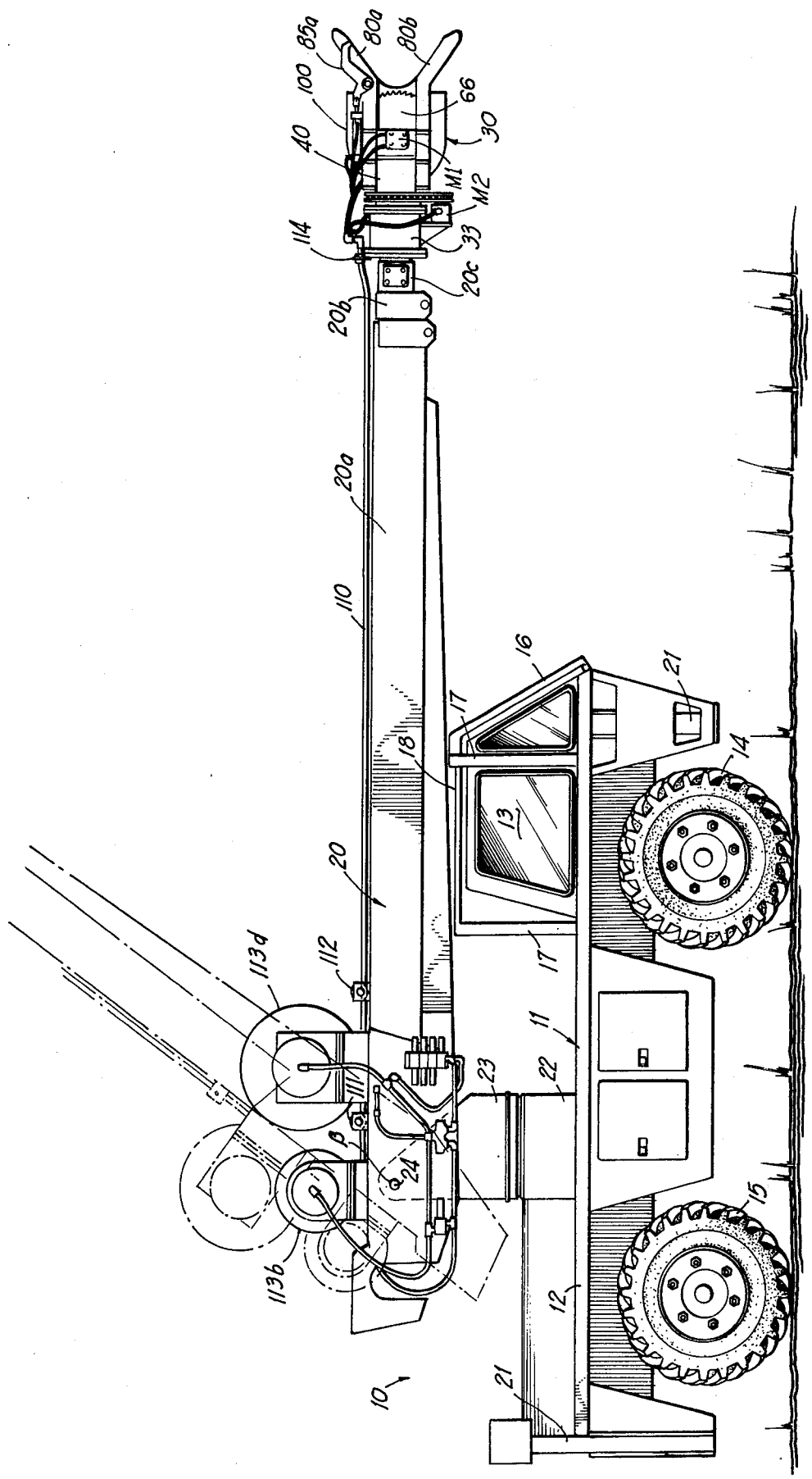
FIG. 2 is a side elevational view of the apparatus shown in FIG. 1, the boom being illustrated in the retracted position and being illustrated as resting upon its carriage.

The hydraulic lines, denoted generally by numeral 110 in FIGS. 1 and 2, extend along the upper surface of the boom 20 and pass beneath idler rollers 111 and 112 on the boom base 20a, pairs of the cables being wrapped around the reels 113a, 113b, 113c, 113d, mounted on the upper surface of the boom base 20a, adjacent its proximal end. The function of the hydraulic reels 113a, 113b, 113c, 113d are to yieldably retract the hydraulic lines 110, as the boom 20 is retracted and to pay out the hydraulic lines 110 as the boom 20 is extended.

The outer ends of these hydraulic lines 110 are connected to a terminal plate 114 carried on the end portion of the boom extension 20c. Appropriate fittings 115 join the lines 110 to distribution lines which include a pair of lines 120 which lead through the central portion of plate ... to the double acting cylinder 70, a pair of lines 121 which lead to the motor M2, a pair of lines 122 which lead to the motor M1 and a pair of lines 123 which lead to the double acting cylinder 94.

Electric controls (not shown) for the various hydraulic elements are located in the cab 13 and lead to solenoid valves V1, V2, V3, in addition to the conventional controls (not shown) for pivoting the boom 20 about the axis α and β and for extending and retracting the boom 20. A supply line 130 supplies hydraulic fluid from sump 119 to a pump 120 which then supplies fluid under pressure by supply line 121 and 110 to rotate motor M1 during the entire period in which the machine is in operation. The motor M1, therefore, rotates the blade 66 so that it is ready for operation, when required. The return line 132 returns the hydraulic fluid to the sump 119. A pressure relief valve V4 is also provided for line 131.

In addition, hydraulic fluid under pressure is supplied by pump 129 through line 133 and 134 to the control valves V1, V2 and V3. A pressure relief valve V5 returns any excess hydraulic fluid to the sump from the lines 133 and 134.

The control valve V3 selectively supplies hydraulic fluid, via line 137 to retract the piston 71a or through the line 138 to extend the piston 71a. A return line 140 from the valve V3 extends the hydraulic fluid to the sump by line 141 and 142. In like fashion, control valve V1 selectively supplies hydraulic fluid to line 144 or line 145 so as to retract or extend the piston 99 of cylinder 94, the fluid being returned to line 141 from low pressure side, as is conventional.

The motor M2, which controlled the pivoting of the assembly about axis γ, is supplied with hydraulic fluid through the control valve V2 which supplied hydraulic fluid selectively to line 148 or 149 so as to enable the motor M2 to rotate the shaft 61 through about 135° in each direction from its neutral position shown in FIG. 1.

Brackets 106 and 107 removably secure the cover 100 to the support members 75a, 75b.

The housing 33, shafts 40, 61, cylinder 70 and piston rod 71 are concentric along longitudinal axis γ. This axis γ also bisects the angle subtended by bars 80a, 80b. The plane of blade 66 is parallel to axis γ and the support members 75a, 75b are parallel to and equidistant from axis γ on opposite sides thereof. Rotation of shaft 40 is about axis γ and the extension and contraction of piston rod 71 is along axis γ. The axis of pin 84 is perpendicular to and offset from axis γ and motor shaft 51 is parallel to and offset from axis γ.

OPERATIONS

From the foregoing description, the operation of the present invention should be apparent. When the device or apparatus of the present invention is to be employed, it is driven by an operator as a motor vehicle to the site where the limbs are to be removed. When the device is so driven, the boom 20 is carried extending forwardly, as seen in FIG. 2, the boom resting upon the cradle 18. When the site is reached, the vehicle 10 is parked adjacent to the tree. If the terrain is not firm, the auxiliary legs 21 are lowered to the position shown in FIG. 1 so as to brace the device for operation. The boom 20 is then manipulated through manipulation of controls (not shown) in cab 13 so as to point it toward the place on the limb L to be severed. Thereafter, the boom 20 is extended and the valve V2 is manipulated so as to dispose the plane of guide bars 80a, 80b transverse to the limb L with the guide bars 80a, 80b on opposite sides of the limb L and also so as to dispose the plane of blade 66 transverse to the limb L and on the side of the limb L adjacent to the trunk of the tree. The boom 20 is further extended so that the limb L is cammed by surfaces 82a, 82b into the throat adjacent concaved surface 78.

Next, the valve V1 is manipulated so as to cause the piston rod 93 to extend and thereby cause the clamps or hooks 85a and 85b to move inwardly to clamp around the outer periphery of the limb L. In such a position, the limb may be severed by actuation of valve V3 so as to extend piston rod 71 and thereby move the motor M1 and blade 66 longitudinally outwardly across the limb L, inwardly of the place where the limb L is clamped. After the limb L has been severed, the valve V3 is again manipulated so as to retract the piston rod 71. The limb L, at that stage, may be released by manipulation of valve V1 so as to retract the piston rod 93; however, it may be found desirable to manipulate the boom 20 in such a way as to clear any electrical cables, before the limb L is dropped by the assembly 30. Thus, when the limb is free, valve V1 is manipulated so as to retract piston 93 and thereby release the limb L.

When the limb L is clamped by the clamp or hooks 85a, 85b the limb L in the throat has an inner peripheral first area which is against the concaved surface 78 and perhaps, if large, against the inner surfaces 82a and 82b. The plane of guide bars or arms 80a, 80b and of axis γ is transverse to the length of the limb L. The the clamps or hooks 85a, 85b engage the limb L at spaced second areas along its length, which second areas are on opposite sides of the transverse plane of bars 80a, 80b and circumferentially spaced from the first area. The cut of saw 66 is along a plane outwardly of a second area and parallel to the plane of the bars or arms 80a, 80b.

The structure of the present device is such that, if desired, the limb L may be pushed free and clear of any electrical cables by extending the boom 20 and perhaps by pivoting the assembly 30 before it is severed and may further be removed from disengagement with the electrical cables, even after it has been severed.

It will be obvious to those skilled in the art that many variations may be made in the embodiment here chosen for the purpose of illistrating the present invention without departing from the scope thereof as defined by the appended claims.

I claim:

1. A limb severing apparatus of the type having a vehicle provided with a telescoping boom pivotally mounted by its proximal end portion to the vehicle for rotation of the boom about an upright axis and for pivotal movement of the boom about a transverse axis adjacent to the vertical axis, the distal end of said boom being extendable and retractable, the combination therewith of a limb engaging and cutting assembly mounted on the distal end of said boom, said assembly including:

(a) support means mounted on said distal end of said boom;

(b) a rotatable member carried by said support means and rotatable with respect thereto;

(c) a pair of diverging guide bars extending from said rotatable member and rotatable therewith, portions of said guide bars inwardly of their outer ends defining a throat therebetween for receiving a limb of a tree, therein;

(d) movable means for releasably confining said limb between said portions of said guide bars;

(e) saw means movable from a position adjacent one side of the confined limb to the other side thereof, through said limb for severing the limb from its tree; and (f) control means for selectively controlling the rotation of said rotatable means, and the movement of said movable means.

2. The apparatus defined in claim 1 wherein said supporting means includes a housing and wherein said rotatable means includes a shaft carried by said housing and protruding therefrom, said housing being fixed to the end portion of said extendable boom and said shaft being fixed to said guide bars.

3. The apparatus defined in claim 2 wherein said control means include a motor carried by said housing for rotating said shaft.

4. The apparatus defined in claim 3 wherein said motor is a hydraulic motor mounted on said housing adjacent one side of said shaft, and including a sprocket mounted on said shaft outwardly of said housing, a sprocket driven by said hydraulic motor and a chain extending around the aforesaid sprockets.

5. The apparatus defined in claim 4 including hydraulic lines extending from said control means to said motor, said hydraulic lines being flexible and including a reel on said boom adjacent to said proximal end, said lines being reeled around said reel as said distal end of said boom is retracted.

6. The apparatus defined in claim 1 wherein said support means includes a housing and said rotatable means includes a hollow shaft journalled by one end portion in said housing, the other end portion of said shaft protruding outwardly of said housing and including a hydraulic cylinder provided with a movable piston disposed along the axis of said shaft and within the hollow portion of said shaft, the end of said piston rod being connected to said cutting means for moving said cutting means into and out of cutting engagement with said limb.

7. The apparatus defined in claim 6 wherein said cutting means includes a motor, a motor mounting platform carried by the end of said piston rod, and a rotary blade rotatable by said motor, said rotary blade having a plane parallel to the axis of said piston rod.

8. The apparatus defined in claim 7 including a cross plate extending between the proximal end portions of said guide bars, said cross plate having a concave surface defining with said guide bars, the throat which receives said limb.

9. The apparatus defined in claim 1 wherein said means for confining said limb includes a hook pivotally mounted adjacent to one of said guide bars and movable from the position adjacent said guide bar across toward the other of said guide bars for engaging the limb.

10. The apparatus defined in claim 9 wherein said control means includes a hydraulically operated cylinder having a piston rod connected to said hook for actuation of the same said cylinder being connected to said rotatable means.

11. The apparatus defined in claim 1 wherein said means for confining said limb includes a pair of opposed hooks disposed on opposite sides of one of said guide bars, a shaft extending through said rotatable member adjacent to the proximal end of one of said guide bars, the ends of said shaft being connected to the shanks of said hooks, and means connected to one of said hooks for actuating said hooks in response to said control means.

12. The apparatus defined in claim 1 wherein said rotatable means includes a hollow shaft and wherein said support means includes a housing journaling one end portion of said hollow shaft for rotation about its axis, and wherein said control means includes a motor mounted on said housing for rotating said shaft with respect to said housing, a pair of diametrically opposed spaced arms connected to opposite sides of said shaft outwardly of said housing for rotating with said shaft, said arms protruding outwardly of said shaft, the inner ends of said guide bars being connected to the outer end portions of said arms, a crossbar connecting the ends of said arms, said crossbar having a concaved surface defining a throat for receiving said limb.

13. The limb severing apparatus defined in claim 1 including a housing on the distal end portion of said boom for carrying said saw means, said housing being rotatable on the end of said boom about generally a longitudinal axis, guide bars protruding from said housing generally in the direction in which said boom is extendable for guiding the limb to be severed toward said saw means, and means for moving said saw means from a position adjacent one side of the limb to the other side thereof, through said limb for severing the limb from its tree.

14. The limb severing apparatus defined in claim 13 including control means for selectively controlling the rotation of said housing and the movement of said saw means.

15. Process of severing and removing a limb from the remaining portion of a tree by means of a member having diverging guide bars in a common plane, the guide bars diverging from a throat outwardly on opposite sides of a longitudinal axis of said member comprising:

(a) arranging said member adjacent to said limb so that said axis points generally toward a first portion of the periphery of said limb which is adjacent to a second portion of said limb which is to be severed;

(b) rotating said member about said axis for disposing the plane of said guide bars generally transverse to said limb;

(c) thereafter moving said member toward said limb so as to position said first portion of the periphery of said limb in said throat and between said guide bars inwardly of the outer ends of said guide bars;

(d) engaging areas of third peripherial portions of said limb which are circumferentially spaced from said first portions and are on opposite sides of said plane and urging these engaged third portions toward said throat for confining a transverse portion of said limb between said throat and the engaged areas;

(e) disposing a saw blade generally parallel to and spaced from the guide arms and in a plane between said transverse portion and said trunk of said tree;

(f) moving said saw for cutting action in the plane of said blade across the second portion of said limb to sever it from the tree;

(g) continuing to engage said limb at its transverse portion; and (h) moving the severed limb away from said tree by moving said member outwardly of said tree.

16. The process defined in claim 15 wherein said member is moved after it has been positioned in said throat for bending said limb prior to the time that it is severed from the remaining portion of said tree.

17. A limb clamping and severing assembly comprising:
(a) a housing,
(b) a rotatable member having an axis of rotation and carried by said housing and rotatable about said axis with respect to said housing;
(c) a pair of diverging guide bars extending from said rotatable member and rotatable therewith, portions of said guide bars inwardly of their outer ends defining a throat therebetween for receiving a limb of a tree, therein;
(d) movable means for releasably confining said limb between said portions of said guide bars;
(e) saw means movable from a position adjacent one side of the confined limb to the other side thereof, through said limb for severing the limb from its tree; and
(f) control means for selectively controlling the rotation of said rotable means, and the movement of said movable means.

18. The assembly defined in claim 17 wherein said rotatable means includes a shaft carried by said housing and protruding therefrom, the outer end of said shaft being fixed to said guide bars.

19. The assembly defined in claim 18 wherein said control means includes a hydraulic motor carried by said housing for rotating said shaft.

20. The assembly defined in claim 19 wherein said motor is mounted on said housing adjacent one side of said shaft, and including a sprocket mounted on said shaft outwardly of said housing, a sprocket driven by said hydraulic motor and a chain extending around the aforesaid sprockets.

21. The assembly defined in claim 20 including hydraulic lines extending from said control means to said motor, said hydraulic lines being flexible and including a reel, said lines being reeled around said reel.

22. The assembly defined in claim 17 wherein said rotatable means includes a hollow shaft journalled by one end portion in said housing, the other end portion of said shaft protruding outwardly of said housing and including a hydraulic cylinder provided with a movable piston disposed along the axis of said shaft and within the hollow portion of said shaft, the end of said piston rod being connected to said cutting means for moving said cutting means into and out of cutting engagement with said limb.

23. A limb severing apparatus of the type having a vehicle provided with a boom pivotally mounted by its proximal end portion to the vehicle for rotation of the boom about an upright axis and for pivotal movement of the boom about a transverse axis adjacent to the vertical axis, and saw means on the distal end portion of said boom for cutting engagement with a limb of a tree, the improvement comprising:
(a) said boom having a longitudinal axis and being telescoping for extending and retracting said distal end along said longitudinal axis;
(b) said saw means having a cutting plane generally parallel to said longitudinal axis;
(c) means for extending and contracting said boom for varying the effective length of said boom along said longitudinal axis;
(d) guide means on opposite sides of said saw means for guiding a limb of a tree into a position for cutting engagement by said saw means; and
(e) said saw means including a saw movable with respect to said guide means from a position adjacent one side of the limb to the other side thereof and control means for selectively controlling the movement of said saw means and also its cutting action.

24. A limb severing apparatus of the type having a vehicle provided with a boom pivotally mounted by its proximal end portion to the vehicle for rotation of the boom about an upright axis and for pivotal movement of the boom about a transverse axis adjacent to the vertical axis, and saw means on the distal end portion of said boom for cutting engagement with a limb of a tree, the improvement comprising:
(a) said boom having a longitudinal axis and being telescoping for extending and retracting said distal end along said longitudinal axis;
(b) said saw means having a cutting plane generally parallel to said longitudinal axis;
(c) means for extending and contracting said boom for varying the effective length of said boom along said longitudinal axis; and
(d) a rotatable member carried by the distal end portion of said boom and being rotatable about a longitudinal axis, said rotatable memeber carrying said saw means, guide means on said rotatable member, said guide means being rotatable with said rotatable member and defining a throat between said guide means, and means for moving said saw means across said throat for severing a limb therein.

25. A limb severing apparatus of the type having a vehicle provided with a boom pivotally mounted by its proximal end portion to the vehicle for rotation of the boom about an upright axis and for pivotal movement of the boom about a transverse axis adjacent to the vertical axis, and saw means on the distal end portion of said boom for cutting engagement with a limb of a tree, the improvement comprising:
(a) said boom having a longitudinal axis and being telescoping for extending and retracting said distal end along said longitudinal axis;
(b) said saw means having a cutting plane generally parallel to said longitudinal axis;
(c) means for extending and contracting said boom for varying the effective length of said boom along said longitudinal axis; and
(d) guide means for guiding a limb into a position for severing by said saw means and clamp means for clamping a limb in said guide means for severing action of said saw means.

26. A limb severing apparatus of the type having a vehicle provided with a boom pivotally mounted by its proximal end portion to the vehicle for rotation of the boom about an upright axis and for pivotal movement of the boom about a transverse axis adjacent to the vertical axis, and saw means on the distal end portion of said boom for cutting engagement with a limb of a tree, the improvement comprising:
(a) said boom having a longitudinal axis and being telescoping for extending and retracting said distal end along said longitudinal axis;
(b) said saw means having a cutting plane generally parallel to said longitudinal axis;
(c) means for extending and contracting said boom for varying the effective length of said boom along said longitudinal axis;
(d) moveable limb clamping means on the distal end of said boom for releasably engaging said limb for holding the same in a position adjacent to said saw means.

27. The limb severing apparatus defined in claim 26 including means for moving said saw means across said limb while the same is held by said limb clamping means.

28. A limb clamping and severing assembly comprising:
 (a) a housing;
 (b) a rotatable member having an axis of rotation and carried by said housing and rotatable about said axis with respect to said housing;
 (c) a pair of spaced guide bars extending from said rotatable member and rotatable therewith, portions of said guide bars inwardly of their outer ends defining a throat therebetween for receiving a limb of a tree, therein;
 (d) movable means for releasably confining said limb between said portions of said guide bars;
 (e) saw means movable from a position adjacent one side of the confined limb to the other side thereof, through said limb for severing the limb from its tree; and
 (f) control means for selectively controlling the rotation of said rotatable means, and the movement of said movable means.

* * * * *